(12) United States Patent
Park

(10) Patent No.: US 9,053,314 B2
(45) Date of Patent: Jun. 9, 2015

(54) INTEGRATED LOGIN INPUT APPARATUS AND METHOD IN PORTABLE TERMINAL

(75) Inventor: Sang-Min Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 276 days.

(21) Appl. No.: 12/959,577

(22) Filed: Dec. 3, 2010

(65) Prior Publication Data
US 2011/0145587 A1    Jun. 16, 2011

(30) Foreign Application Priority Data

Dec. 11, 2009   (KR) .................. 10-2009-0123192

(51) Int. Cl.
G06F 21/00 (2013.01)
G06F 21/36 (2013.01)
G06F 21/31 (2013.01)

(52) U.S. Cl.
CPC .............. G06F 21/36 (2013.01); G06F 21/316 (2013.01); G06F 21/31 (2013.01)

(58) Field of Classification Search
CPC ....... G06F 21/316; G06F 21/31; G06F 21/36; H04L 63/083
USPC ..................... 713/182, 202; 726/19
See application file for complete search history.

(56) References Cited

U.S. PATENT DOCUMENTS

| | | | | |
|---|---|---|---|---|
| 1,910,425 | A * | 5/1933 | Cahill | 33/1 A |
| 5,335,557 | A * | 8/1994 | Yasutake | 73/862.043 |
| 6,460,038 | B1 * | 10/2002 | Khan et al. | 1/1 |
| 6,720,860 | B1 * | 4/2004 | Narayanaswami | 340/5.54 |
| 2004/0230843 | A1 * | 11/2004 | Jansen | 713/202 |
| 2007/0198843 | A1 * | 8/2007 | Cradick et al. | 713/182 |
| 2010/0180336 | A1 * | 7/2010 | Jones et al. | 726/19 |
| 2010/0251359 | A1 * | 9/2010 | Shirai et al. | 726/19 |

* cited by examiner

Primary Examiner — Syed Zaidi
(74) Attorney, Agent, or Firm — Jefferson IP Law, LLP

(57) ABSTRACT

An apparatus and method in a portable terminal for an integrated login input are provided. The integrated login input method includes, displaying a plurality of images during registration of a password, displaying a plurality of images, selecting one of the plurality of displayed images, determining a coordinate system according to an encryption level to be set for the password and applying the determined coordinate system to the selected image, changing a tilt of the portable terminal by an angle and detecting the changed tilt, receiving a selection of the user on a region of the selected image, and combining the detected tilt and coordinates corresponding to the region where the user's selection is generated and registering the combination as the password.

24 Claims, 8 Drawing Sheets

(RELATED ART)　(RELATED ART)　(RELATED ART)

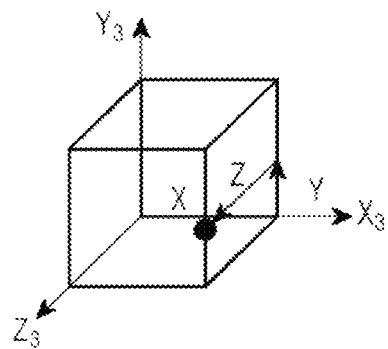
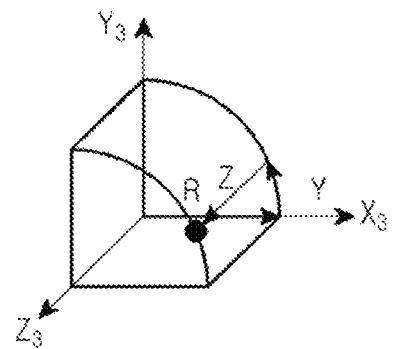
FIG.6A                FIG.6B
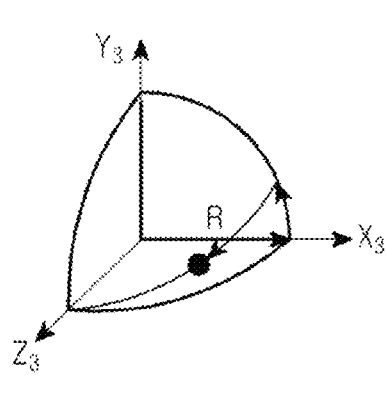
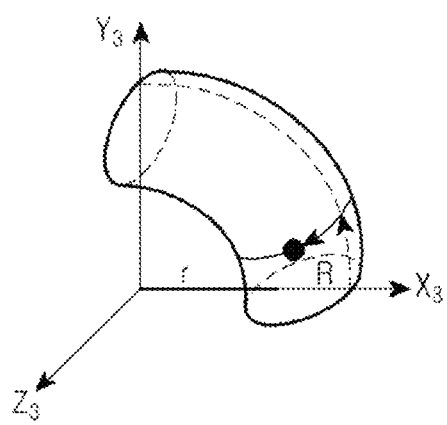
FIG.6C                FIG.6D

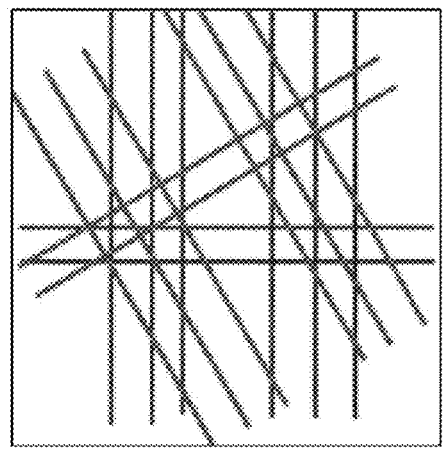 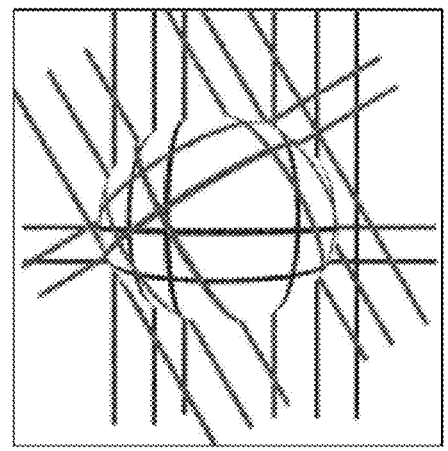
FIG.7A  FIG.7B
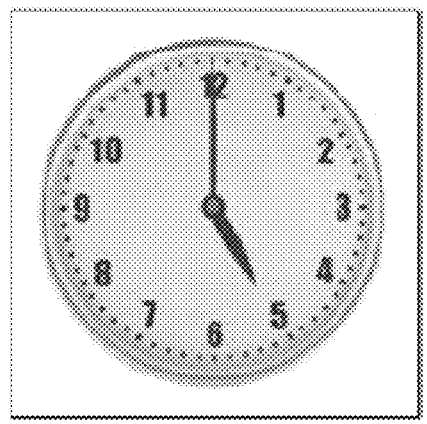 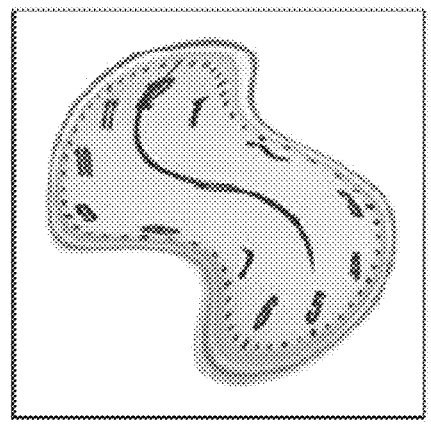
FIG.7C  FIG.7D

INTEGRATED LOGIN INPUT APPARATUS AND METHOD IN PORTABLE TERMINAL

PRIORITY

This application claims the benefit under 35 U.S.C. §119(a) of a Korean patent application filed in the Korean Intellectual Property Office on Dec. 11, 2009 and assigned Serial No. 10-2009-123192, the entire disclosure of which is hereby incorporated by reference.

BACKGROUND OF THE INVENTION

1. Field of the Invention

The present invention relates to an apparatus and a method for inputting information into a portable terminal. More particularly, the present invention relates to an integrated login input apparatus and method in a portable terminal, by which a password having a high encryption level is set by using a coordinate system and a tilt sensor that is included in the portable terminal.

2. Description of the Related Art

When a personalized Internet service, such as a Social Networking Service (SNS), is used in a portable terminal, a basic login process is required to ensure a user's privacy. However, the login process results in an inconvenience to the user when there are multiple login processes for an SNS that becomes more finely subdivided.

To enter a password in the login process, a keyboard for a Personal Computer (PC), a QWERTY board for a Personal Digital Assistant (PDA) terminal, a keypad button for a portable terminal, and the like are generally used. However, if a Liquid Crystal Display (LCD) is provided for any of those devices, it typically has a smaller size such that, when the LCD is also used as a touch screen for input, an input error is very likely to occur due to the small size and if touch sensitivity is not good. To address the foregoing problem, an integrated password scheme using an auto-fill function has been proposed.

FIGS. 1A through 1C are diagrams illustrating a screen during password input in a portable terminal of the related art.

Referring to FIG. 1A, a portable terminal may be provided with a 3-set keyboard for entering a password. However, password input using a 3-set keyboard is difficult as it requires many keystrokes. Referring to FIG. 1B, during an authentication process, a user may be inconvenienced by having to input not only a password but also a username. Moreover, the user may be required to answer additional questions regarding the saving of and use of the password in the future. Referring to FIG. 1C, a user may input a password using a single key such as a numeric key. Input of a single key is easy when used for a one-digit password. However, because the keyboard has a limited number of keys, the degree of encryption is reduced in comparison to an input number.

Moreover, in an input scheme using motion input detected by a motion detector of a portable terminal, users' hand shakes may vary from user to user so that the input scheme may have an error according to the slight differences in degree of vibration. In this case, when a number of input attempts is higher than a predetermined level, the multiple inputs may cause a lock down of the device. Thus, a scheme having large input variation such as the motion input scheme is not suitable for password input requiring accuracy.

SUMMARY OF THE INVENTION

An aspect of the present invention is to address at least the above-mentioned problems and/or disadvantages and to provide at least the advantages described below. Accordingly, an aspect of the present invention is to change a tilt of a portable terminal to a user desired angle, and then display a particular image to which a predetermined coordinate system is applied on a display screen having a touch screen, such that a user's touch input on a predetermined region of the display screen and the tilt of the portable terminal are sensed for password registration.

According to an aspect of the present invention, an integrated login input method in a portable terminal is provided. The integrated login input method includes, displaying a plurality of images during registration of a password, selecting one of the plurality of displayed images, determining a coordinate system according to an encryption level to be set for the password and applying the determined coordinate system to the selected image, changing a tilt of the portable terminal by an angle and detecting the changed tilt, receiving a selection of the user on a region of the selected image, and combining the detected tilt and coordinates corresponding to the region where the user's selection is generated and registering the combination as the password.

According to another aspect of the present invention, an integrated login input apparatus in a portable terminal is provided. The integrated login input apparatus includes a tilt sensor for acquiring a tilt according to a tilt state of the portable terminal and a controller for applying a coordinate system to an image selected through a display unit of the portable terminal on the display unit, for detecting the tilt acquired by the tilt sensor and coordinates corresponding to a region of the displayed image selected by a user, for combining the tilt and the coordinates to store the combination as a password, and for performing an auto-fill function with a value stored in the memory when driving an Application Programming Interface (API) of a program to be executed.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 6A through 6D illustrate coordinate systems stored in a portable terminal according to an exemplary embodiment of the present invention;

FIGS. 7A through 7D are diagrams illustrating the application of a filter to an image having a predetermined tilt based on the tilt in a portable terminal according to an exemplary embodiment of the present invention.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes or modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A portable terminal as described below denotes a complex terminal that provides a Social Networking Service (SNS) over a wired/wireless public network. However, the present invention is not limited thereto. Therefore, the portable terminal as described in the following exemplary embodiments of the present invention is applicable to any mobile communication terminal, and obviously, may be applied to any kind of information communication devices and multimedia devices, such as a digital broadcasting terminal, a Personal Digital Assistant (PDA), a smart phone, $3^{rd}$ Generation (3G) terminals such as an International Mobile Telecommunication (IMT)-2000 terminal, a Wideband Code Division Multiple Access (WCDMA) terminal, a Global System for Mobile Communication/General Packet Radio Service (GSM/GPRS) terminal, and a Universal Mobile Telecommunication Service (UMTS) terminal, and applications thereof.

In the following description, the term "tilt" denotes a tilt of the portable terminal. Furthermore, according to an exemplary implementation, the tilt of the portable terminal is recognized as 0 degrees when the portable terminal, with reference to a normal viewing orientation, is positioned perpendicular to the ground.

According to an exemplary embodiment of the present invention, a password is established according to a tilt of the portable terminal that is associated with a location of a touch input on a displayed image.

Figure 3:
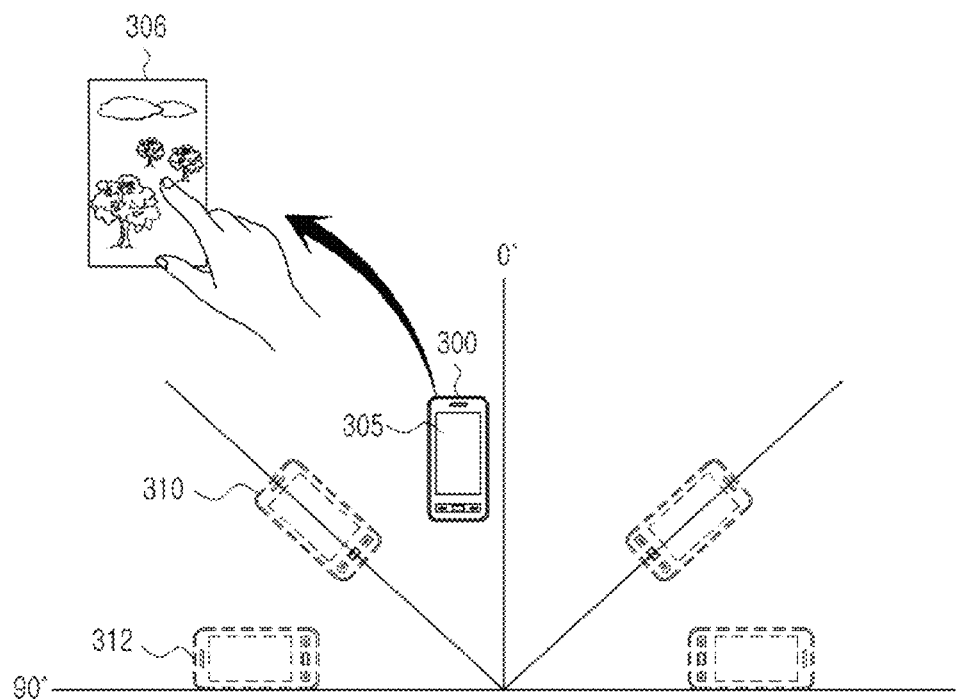
FIG. 3 illustrates movements of a portable terminal during an integrated login input process according to an exemplary embodiment of the present invention.

FIG. 3 illustrates movements of a portable terminal during an integrated login input process according to an exemplary embodiment of the present invention.

Referring to FIG. 3, when an Application Programming Interface (API) of a particular SNS to which the user logs in is driven, a tilt sensor included in the portable terminal determines an angle or tilt of the portable terminal with respect to a benchmark orientation. For example, the tilt sensor measures a tilt as 0 degrees when the portable terminal, with respect to its upright viewing orientation, is positioned perpendicular to the ground as indicated by 300. Similarly, the tilt sensor measures a tilt as 90 degrees when the portable terminal is positioned parallel to the ground as indicated by 312 and as 45 degrees when the portable terminal is positioned intermediate to the positions perpendicular to the ground and parallel to the ground as indicated by 310. Furthermore, although not illustrated in FIG. 3, the tilt sensor determines a tilt of the portable terminal with respect to both a horizontal plane and a vertical plane.

The portable terminal also determines an input of a user touch on a predetermined region of an image 306 displayed on a display screen 305. More specifically, when the user tilts the portable terminal at an angle, such as an angle 300, 310, or 312, or any angle there between, coordinates corresponding to the location of the touch input are detected.

The detected coordinates and the measured tilt are combined and the combination is stored as a password for the driven SNS.

Thereafter, when the API of the SNS is driven to login to the SNS site, the stored password is used for determining authenticity of the user.

A synopsis of the integrated login input process in a portable terminal according to an exemplary embodiment of the present invention has been described above. Hereinafter, a more detailed description will be made of an integrated login apparatus in a portable terminal according to an exemplary embodiment of the present invention.

Figure 1A:
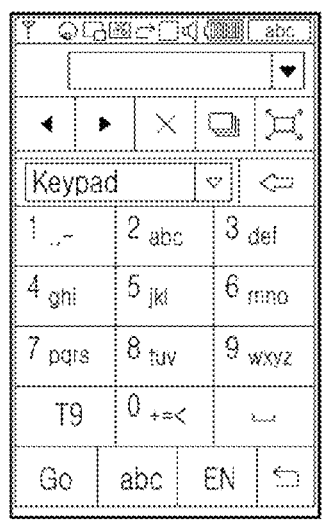
FIGS. 1A through 1C are diagrams illustrating a screen during password input in a portable terminal of the related art.
Figure 1B:
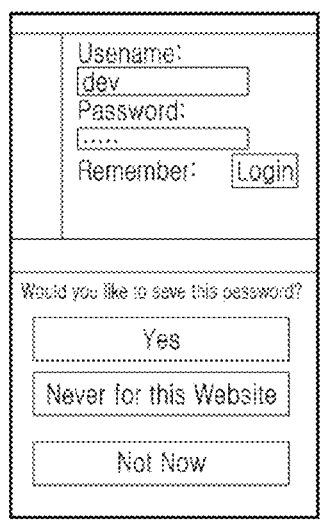
Figure 1C:
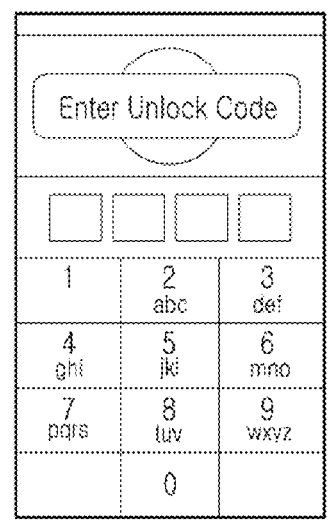
Figure 2:
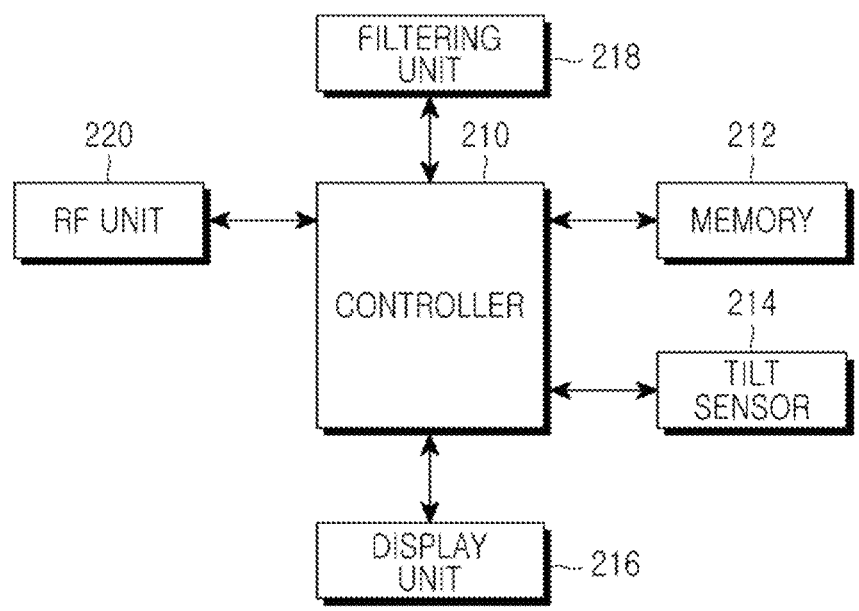
FIG. 2 is a block diagram of an integrated login input apparatus in a portable terminal according to an exemplary embodiment of the present invention.

FIG. 2 is a block diagram of an integrated login input apparatus in a portable terminal according to an exemplary embodiment of the present invention.

Referring to FIG. 2, the portable terminal includes a controller 210, a memory 212, a tilt sensor 214, a display unit 216, a filtering unit 218, and a Radio Frequency (RF) unit 220.

The tilt sensor 214 is a sensor for determining a tilt of the portable terminal. Upon sensing execution of a particular function (e.g., driving of an API of an SNS), the tilt sensor 214 senses a horizontal tilt and a vertical tilt of the portable terminal and outputs the sensed tilts to the controller 210. In other words, the tilt sensor 214 acquires the horizontal tilt and the vertical tilt according to a tilt state of the portable terminal and outputs the tilts to the controller 210.

The controller 210 controls operations of the portable terminal. For example, the controller 210 performs processing and control for voice communication and data communication.

In addition, when a password is to be registered, the controller 210 applies a coordinate system to an image displayed through the display unit 216, detects a tilt acquired by the tilt sensor 214, detects coordinates corresponding to a region selected by the user in the displayed image, and combines the tilt and the coordinates to store the combination as a password for the SNS.

Thereafter, when the API of the SNS is driven to login to the SNS site, the password stored in the memory 212 is used to determine authenticity of the user.

More specifically, the API of a particular SNS is driven when the portable terminal needs to enter a password in order to join the SNS. In that case, the controller 210 displays a plurality of images stored in the memory 212 through the display unit 216 and receives a selection of one of the displayed images from the user.

The display unit 216 is implemented with a touch screen and may also serve as a key input unit. As an example, a selection from the user may correspond to a tapping motion on the touch screen.

The controller 210 determines a coordinate system according to an encryption level to be set for the password, and applies the determined coordinate system to the image selected by the user.

FIGS. 6A through 6D illustrate coordinate systems stored in a portable terminal according to an exemplary embodiment of the present invention.

Referring to FIG. 6A, a Cartesian coordinate system may be applied to the image selected by the user. Alternatively, a cylindrical coordinate system as shown in FIG. 6B, a spherical coordinate system as shown in FIG. 6C, or a toroidal coordinate system as shown in FIG. 6D may be used. Also, the coordinate system provided by the controller 210 may be previously set according to the encryption level of the registration password, or may be selected by the user.

Figure 8:
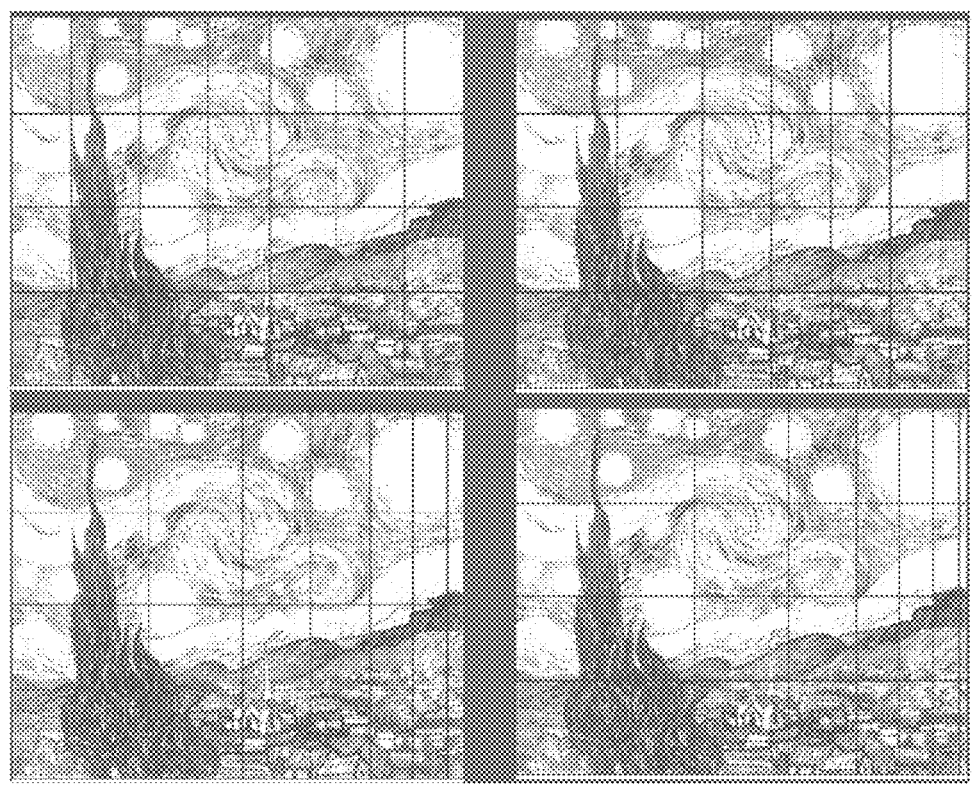
FIG. 8 illustrates a change in coordinates of a coordinate system with a tilt of a portable terminal according to an exemplary embodiment of the present invention.

FIG. 8 illustrates a change in coordinates of a coordinate system with a tilt of a portable terminal according to an exemplary embodiment of the present invention.

Referring to FIG. 8, the image to which the coordinate system is applied is displayed through the display unit 216

It can also be seen in FIG. 8 that coordinates of the coordinate system change with a tilt of the portable terminal.

As the tilt of the portable terminal increases, a weight value is applied to the coordinate system applied to the image by using the filtering unit 218 to acquire coordinates of the coordinate system, as shown in respective images of FIG. 8.

In other words, after a filter is applied to the previously set or user-selected coordinate system according to the tilt acquired by the tilt sensor 214 of the portable terminal and then a weight value is applied to the filter-applied coordinate system, coordinates of a region selected by the user on the respective images shown in FIG. 8 are detected.

As such, the aforementioned operation of the controller 210 is performed to register a password due for joining an SNS when it is determined during the driving of the API that there is no password corresponding to the SNS in the memory 212.

The password registration in the controller 210 is also performed in substantially the same way as described above when the password needs to be changed, for example when the password is forgotten.

Afterwards, when the SNS is driven, if the password corresponding to the driven SNS has already been stored in the memory 212, the controller 210 displays an image and a coordinate system, used at the time of password registration, through the display unit 216, and determines if the same value as a tilt detected at the time of password registration is generated with a change in the tilt state of the portable terminal. If the same value is generated, the controller 210 determines if a selection on a particular region of the displayed image is input from the user.

If the user's input selection on the predetermined region of the image to which the coordinate system is applied matches coordinates stored in the memory 212, the controller 210 permits the user to log in to the SNS site.

In an exemplary implementation, an auto-login operation may be performed by automatically providing corresponding IDentification (ID) and password at the time of login to the SNS site under the control of the controller 210.

Meanwhile, the memory 212 includes a Read Only Memory (ROM), a Random Access Memory (RAM), and a flash ROM, and stores not only programs for operating the controller 210 but also a plurality of images, a plurality of coordinate systems, and a combination of a tilt and coordinates generated in a particular image as a password corresponding to a particular SNS. The RF unit 220 performs a wireless communication function of the portable terminal.

Hereinafter, an integrated login input method in a portable terminal according to an exemplary embodiment of the present invention will be described.

Figure 4:
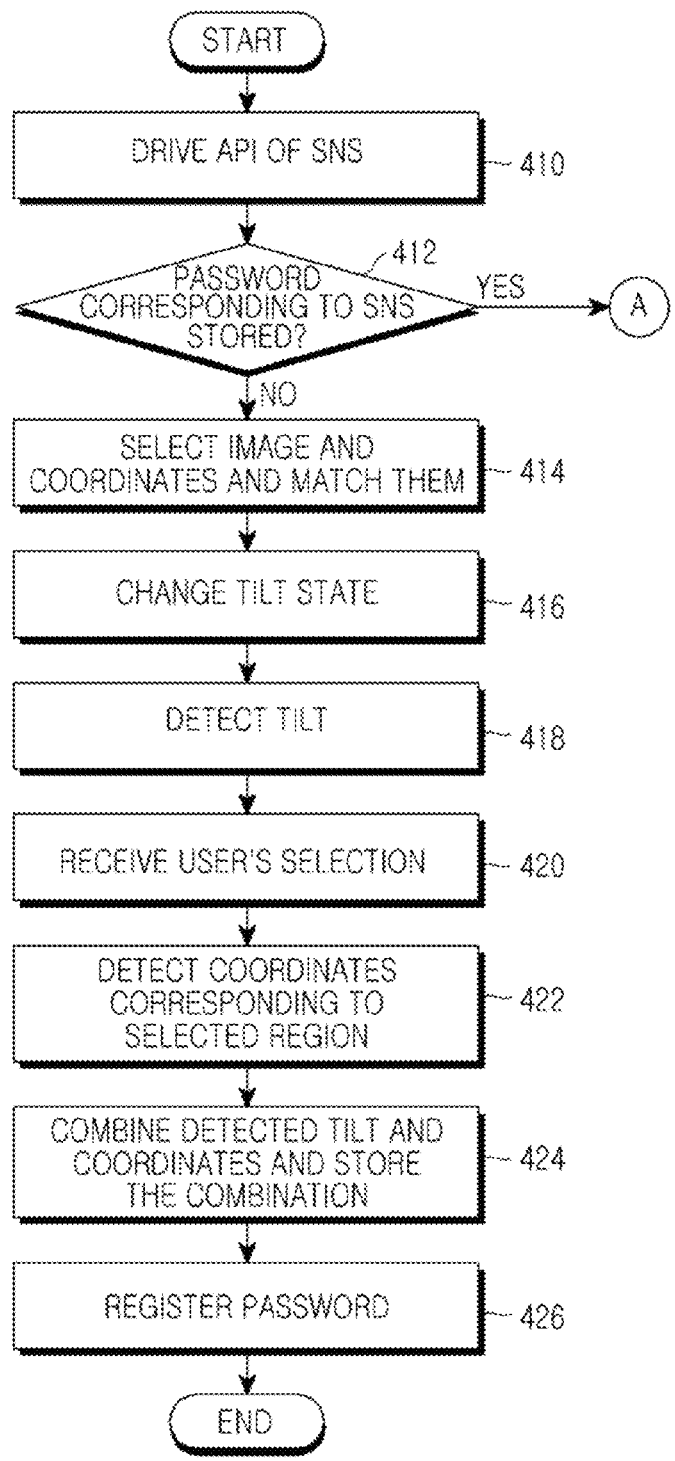
FIGS. 4 and 5 are flowcharts illustrating an integrated login input method in a portable terminal according to an exemplary embodiment of the present invention.
Figure 5:
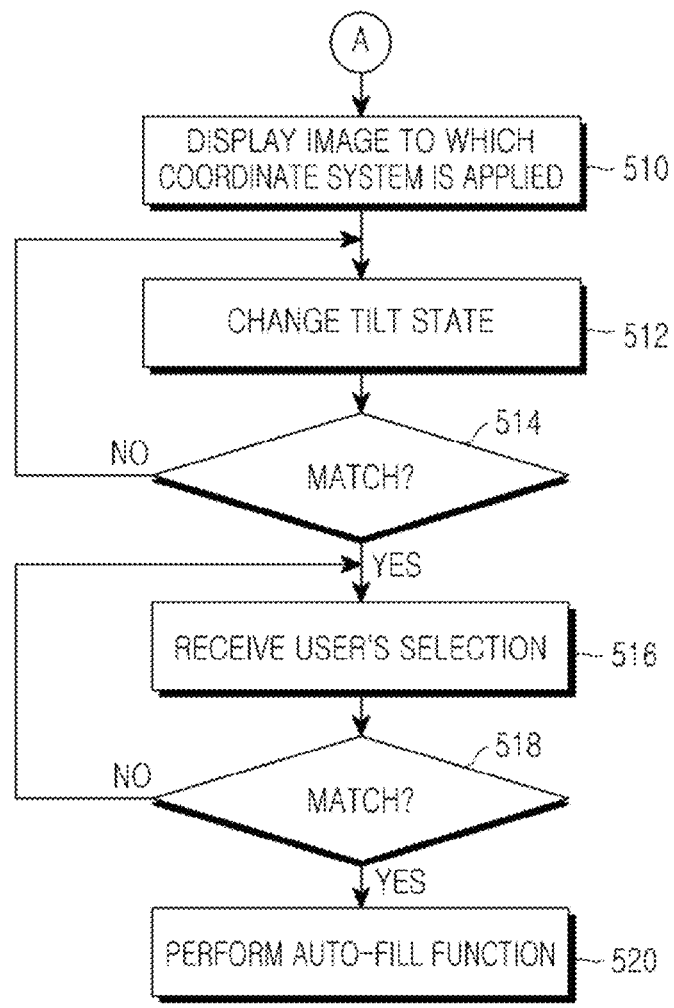

FIGS. 4 and 5 are flowcharts illustrating an integrated login input method in a portable terminal according to an exemplary embodiment of the present invention.

Referring to FIG. 4, in step 410, an API of a particular SNS to which a user logs in is driven in the portable terminal. In step 412, it is determined whether a password corresponding to the driven SNS has been stored. If it is determined in step 412 that a password corresponding to the driven SNS has not been stored, the method proceeds to step 414 to register a password due to joining of the SNS and login to the SNS.

In step 414, a plurality of images are displayed and one of the displayed images is selected by the user. A coordinate system is selected according to an encryption level to be set for the password, and the selected coordinate system is matched to the selected image by the user so that the selected coordinate system can be applied to the selected image by the user.

Herein, the coordinate system may be previously set or selected by the user.

If a tilt state of the portable terminal changes in step 416, a tilt is detected with a tilt sensor in step 418. A selection on a predetermined region of the displayed image is input from the user in a state where the portable terminal is tilted in step 420. The selection input may be generated simultaneously or sequentially.

Coordinates corresponding to the predetermined region selected on the displayed image in step 420 are detected in step 422, and the detected coordinates and the detected tilt are combined to be stored as a password for the SNS in step 424. The stored password is registered as the password for the SNS in step 426.

In an exemplary implementation, the coordinate detection in step 422 is performed by applying a filter to the coordinate system previously set or selected by the user according to the tilt detected in step 418, and applying a weight to the filter-applied coordinates.

FIGS. 7A through 7D are diagrams illustrating the application of a filter to an image having a predetermined tilt based on the tilt in a portable terminal according to an exemplary embodiment of the present invention.

Referring to FIG. 7A, a filter for weight application is applied to a particular image to which an orthogonal coordinate system has been applied. The result of the filter application is illustrated in FIG. 7B.

Furthermore, although application of the filter as illustrated in FIGS. 7A and 7B was to a graphical design image, the filter operation may be similarly applied to an actual image, as shown in FIGS. 7C and 7D.

Referring again to FIG. 4, if it is determined in step 412 that the password corresponding to the SNS has already been stored, the process follows path 'A,' illustrated in FIG. 5, for login using the password.

Referring to FIG. 5, an image used at the time of password registration and a coordinate system applied to the image are displayed in step 510.

After the tilt state of the portable terminal is changed in step 512, it is determined whether the same value as a tilt detected at the time of password registration is generated in step 514. If it is determined in step 514 that the same tilt value is detected as the value at the time of password registration, a selection on a particular region of the displayed image is input from the user in step 516.

In step 518, it is determined if the tilt and the user's selection input on the predetermined region match previously stored coordinates. If it is determined in step 518 that the tilt and the user's selection input on the predetermined region match previously stored coordinates, the auto-login to the SNS site is performed in step 520. On the other hand, if it is determined in step 518 that the tilt and the user's selection input on the predetermined region do not match previously stored coordinates, the method returns to step 516 to again receive the user's selection. Similarly, if it is determined in step 514 that the same tilt value is not detected as the value at the time of password registration, the method returns to step 512 to again receive a changed tilt state.

As can be appreciated from the foregoing description, a recognition rate of a user input can be improved by a coordinate system using a filter and a tilt sensor. Moreover, in a portable terminal using a touch screen, a password having a high encryption level can be set through a user's simple touch input and a tilt state of the portable terminal.

The integrated login input method and apparatus according to exemplary embodiments of the present invention can be achieved as described above.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An integrated login input method in a portable terminal, the method comprising:
   displaying an image;
   detecting a tilt of the portable terminal during the displaying of the image;
   detecting one or more coordinates corresponding to one or more touched points on the displayed image in a state where the tilt of the portable terminal is maintained; and
   combining the detected tilt and the one or more coordinates and registering the combination as the password.

2. The method of claim 1, further comprising, activating an auto-fill function during input of information after driving an Application Programming Interface (API) of a program to which login is to be performed.

3. The method of claim 1, wherein the tilt of the portable terminal is perpendicular to an enlargement or reduction rate of the image.

4. The method of claim 1, further comprising, applying at least one of a predetermined coordinate system and selected coordinate system by a user to the image.

5. The method of claim 4, wherein the coordinate system comprises at least one of a Cartesian coordinate system, a cylindrical coordinate system, a spherical coordinate system, and a toroidal coordinate system.

6. The method of claim 4, wherein the coordinate system applied to the image is such that coordinates of the coordinate system change with the tilt of the portable terminal.

7. The method of claim 4, wherein the one or more coordinates corresponding to the one or more touched points are acquired by applying a filter to the coordinate system according to tilts along three axes including an x axis, a y axis, and a z axis in the angle.

8. The method of claim 4, further comprising,
   determining whether a password has already been stored when driving an Application Programming Interface (API) of a program to be executed;
   if the password has already been stored, displaying the image, to which the coordinate system is applied, on a display screen of the portable terminal;
   detecting a change in the tilt of the portable terminal;
   comparing the changed tilt with the tilt stored during registration of the password, and, if they match, detecting one or more touched points of the displayed image by a user; and
   if the one or more touched points match coordinates input by the user during registration of the password, logging in to the program to be executed.

9. The method of claim 8, wherein the program comprises a Social Networking Service (SNS).

10. The method of claim 8, further comprising using an auto-fill function of an IDentification (ID) and a password at the time of login to the program.

11. The method of claim 8, wherein the detecting of the change in the tilt comprises applying a weight value to the filter-applied coordinates system applied to the image as the tilt of the portable terminal increases from 0 degrees.

12. The method of claim 11, wherein, when the portable terminal is positioned perpendicular to the ground, the tilt of the portable terminal is measured as 0 degrees.

13. The method of claim 1, wherein the displayed image is an image selected from a plurality of the images.

14. The method of claim 13, wherein the plurality of images are displayed during registration of a password due to joining of a particular Social Networking Service (SNS) and further wherein the registering of the combination as the password comprises registering the combination as the password for the SNS.

15. An integrated login input apparatus in a portable terminal, the apparatus comprising:
   a tilt sensor for acquiring a tilt according to a tilt state of the portable terminal; and
   a controller for displaying an image through a display unit, for detecting the tilt acquired by the tilt sensor and one or more coordinates corresponding to one or more touched points on the displayed image in a state where the tilt of the portable terminal is maintained, and for combining the tilt and the one or more coordinates to register the combination as the password.

16. The apparatus of claim 15, wherein the one or more coordinates are acquired by applying a weight value to a filter-applied coordinate system applied to the image as the tilt of the portable terminal increases.

17. The apparatus of claim 15, wherein the controller registers the password in the same manner when the password is forgotten.

18. The apparatus of claim 15, wherein the controller activates an auto-fill function during input of information after driving an Application Programming Interface (API) of a program to which login is to be performed.

19. The apparatus of claim 15, wherein the combining of the tilt and the one or more coordinates to register the combination as a password comprises registering the combination as a password for a Social Networking Service (SNS) and further wherein an Application Programming Interface (API) is driven for the SNS as the program to be executed.

20. The apparatus of claim 15, wherein the displayed image is an image applied at least one of a predetermined coordinate system and selected system by a user.

21. The apparatus of claim 20, wherein the coordinate system comprises at least one of a Cartesian coordinate system, a cylindrical coordinate system, a spherical coordinate system, and a toroidal coordinate system.

22. The apparatus of claim 20, wherein the coordinate system applied to the image is such that coordinates of the coordinate system change with the tilt of the portable terminal.

23. The apparatus of claim 20, wherein the one or more coordinates corresponding to the one or more touched points are acquired by applying a filter to the coordinate system according to tilts along three axes including an x axis, a y axis, and a z axis in the angle.

24. The apparatus of claim 15, wherein the controller further performs an auto-fill function with a value stored in a memory when driving an Application Programming Interface (API) of a program to be executed.

* * * * *